US011085587B2

(12) United States Patent
Schwarzl et al.

(10) Patent No.: US 11,085,587 B2
(45) Date of Patent: Aug. 10, 2021

(54) PRESSURISED GAS CYLINDER

(71) Applicant: MAGNA STEYR Fuel Systems GesmbH, Sinabelkirchen (AT)

(72) Inventors: Gerald Schwarzl, Weiz (AT); Gerald Rath-Reber, Bad Blumau (AT)

(73) Assignee: MAGNA Energy Storage Systems GesmbH, Sinabelkirchen (AT)

( * ) Notice: Subject to any disclaimer, the term of this patent is extended or adjusted under 35 U.S.C. 154(b) by 447 days.

(21) Appl. No.: 15/818,843

(22) Filed: Nov. 21, 2017

(65) Prior Publication Data

US 2018/0156389 A1    Jun. 7, 2018

(30) Foreign Application Priority Data

Dec. 6, 2016  (EP) .................... 16202391

(51) Int. Cl.
| | |
|---|---|
| *F17C 13/04* | (2006.01) |
| *F17C 1/02* | (2006.01) |
| *B01D 46/00* | (2006.01) |
| *B01D 46/10* | (2006.01) |
| *F17C 1/16* | (2006.01) |

(52) U.S. Cl.
CPC .......... *F17C 13/04* (2013.01); *B01D 46/0005* (2013.01); *B01D 46/10* (2013.01); *F17C 1/02* (2013.01); *F17C 1/16* (2013.01); *F17C 2201/0104* (2013.01); *F17C 2203/0604* (2013.01); *F17C 2203/0663* (2013.01); *F17C 2205/0323* (2013.01); *F17C 2205/0326* (2013.01); *F17C 2205/0341* (2013.01); *F17C 2205/0391* (2013.01); *F17C 2221/033* (2013.01); *F17C 2260/05* (2013.01); *F17C 2270/0168* (2013.01)

(58) Field of Classification Search
CPC .............. F17C 13/04; F17C 2203/0604; F17C 2205/0323; F17C 2205/0341; B01D 46/0005; B01D 46/10
USPC ......................................................... 220/562
See application file for complete search history.

(56) References Cited

U.S. PATENT DOCUMENTS

| | | | |
|---|---|---|---|
| 6,510,959 B1 * | 1/2003 | Van Newenhizen | ....................... B65D 90/046 220/327 |
| 2011/0210515 A1 * | 9/2011 | Sharp | ........................ F17C 1/16 277/312 |
| 2014/0352817 A1 * | 12/2014 | Suzuki | .................. F17C 13/026 137/550 |
| 2014/0360371 A1 * | 12/2014 | Seitz | .................. B01D 46/0005 95/286 |

(Continued)

FOREIGN PATENT DOCUMENTS

| | | |
|---|---|---|
| CN | 2889453 Y | 4/2007 |
| CN | 201290974 Y | 8/2009 |
| CN | 205127046 U | 4/2016 |

(Continued)

*Primary Examiner* — Anthony D Stashick
*Assistant Examiner* — Raven Collins
(74) *Attorney, Agent, or Firm* — Jordan IP Law, LLC; Todd A. Vaughn

(57) ABSTRACT

A pressurized gas cylinder having a bottle neck, a valve arranged in the bottle neck for extraction of a stored compressed gas from the pressurized gas cylinder, a filter for filtering contaminants from the compressed gas, and a support sleeve for supporting the bottle neck and to which the filter is attached radially inwardly thereon.

16 Claims, 2 Drawing Sheets

(56) References Cited

U.S. PATENT DOCUMENTS

2017/0304763 A1* 10/2017 Nelson ................. B01D 46/543
2018/0162081 A1* 6/2018 Kloft ......................... F17C 1/16

FOREIGN PATENT DOCUMENTS

| EP | 0552915 A1 | 7/1993 |
| KR | 100837973 B1 | 6/2008 |
| WO | 2011132063 A2 | 10/2011 |
| WO | 2011132063 A3 | 1/2012 |

* cited by examiner

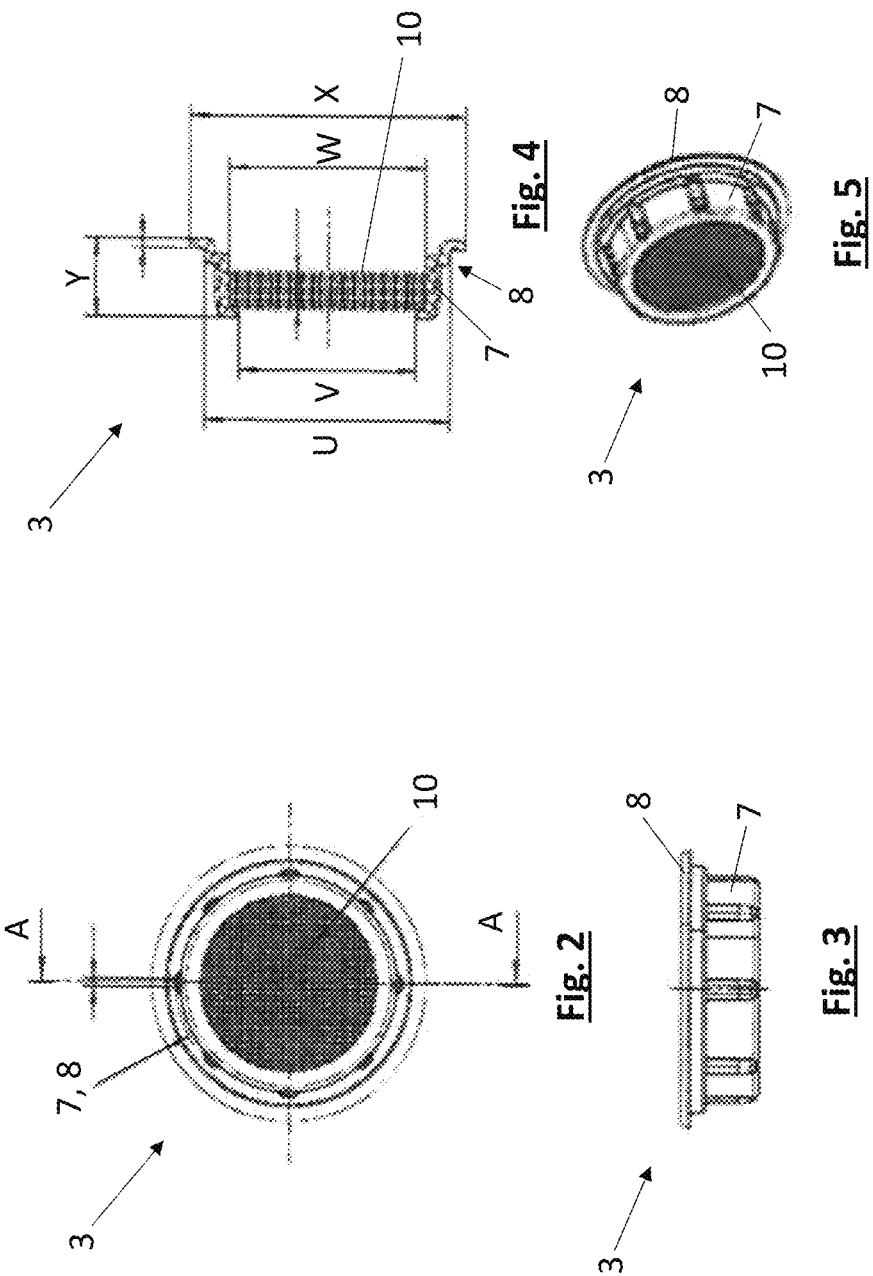

PRESSURISED GAS CYLINDER

CROSS-REFERENCE TO RELATED APPLICATIONS

The present application claims priority under 35 U.S.C. § 119 to European Patent Application No. EP 16202391.5 (filed on Dec. 6, 2016), which is hereby incorporated by reference in its complete entirety.

TECHNICAL FIELD

Embodiments relate to a pressurized gas cylinder comprising a bottle neck and a valve arranged in the bottle neck for extraction of a stored compressed gas from the pressurized gas cylinder.

BACKGROUND

Pressurized gas cylinders are used to store gases under high pressure, in particular, in order to supply compressed gases such as Compressed Natural Gas (CNG) as a propellant for gas-powered vehicles.

Such pressurized gas cylinders normally comprise a valve for extraction of the stored compressed gas from the pressurized gas cylinder, the valve being arranged in a bottle neck of the pressurized gas cylinder.

Such extraction valves, however, are at risk of being damaged by contaminants in the compressed gas which may result for example from production of the pressurized gas cylinder. In order to protect the valve from such contaminants, it is known to integrate a filter in a valve which filters out larger particles, which could damage the valve, from the gas flow. Because of the restricted installation space, however, such integrated filters only have a limited absorption capacity for dirt particles. The construction and exchange of such valves is costly.

SUMMARY

Embodiments provide for an enhanced pressurized gas cylinder, and particularly, a pressurized gas cylinder which has a high absorption capacity for the filtration of particles.

In accordance with embodiments, a pressurized gas cylinder may comprise a bottle neck, a valve arranged in the bottle neck for extraction of a stored compressed gas from the pressurized gas cylinder; a filter configured to filter contaminants out of the compressed gas; and a support sleeve arranged radially inwardly in the bottle neck and configured to support the bottle neck, wherein the filter is attached radially inwardly on the support sleeve.

In accordance with embodiments, a filter, which is configured to protect an extraction valve arranged in the bottle neck, is not integrated in the valve itself, but is attached as a separate component to a support sleeve which supports the bottle neck. The support sleeve, therefore, has the greatest possible cross-section in the region of the bottle neck. The support sleeve, therefore, allows, in addition to mechanical support of the bottle neck, installation of a filter with a high absorption capacity. Also, the filter may be installed, and if necessary, replaced independently of the valve. The entire structure of the pressurized gas cylinder, therefore, is more robust due to such an arrangement of a support sleeve with an inner filter.

In accordance with embodiments, the pressurized gas cylinder is composed of a fibre composite material and has an inner liner. The support sleeve is configured to support an open end of the inner liner which forms the bottle neck.

In accordance with embodiments, the filter is pressed into the support sleeve.

In accordance with embodiments, the valve is arranged spatially in close proximity to the open end of the bottle neck than the filter, and also is in close proximity to the open end than the support sleeve. The gas flowing out of the pressurized gas cylinder thus flows first through the filter and only then through the valve in the bottle neck.

In accordance with embodiments, the valve may comprise a magnetic valve.

In accordance with embodiments, the valve is attached to a valve holder, which itself is attached to the inner liner of the pressurized gas cylinder, and particularly, attached via screw attachment to the inner liner.

In accordance with embodiments, the valve holder may surround the inner liner radially outwardly, and thus, support the liner from the outside, while the support sleeve supports it from the inside.

In accordance with embodiments, the valve may be arranged substantially axially outside the inner liner.

In accordance with embodiments, the filter comprises a filter frame which is configured to be pressed into the support sleeve. Like the bottle neck and the support sleeve, the filter frame may have a substantially circular cross-section. In the interior of the filter frame, the filter may have a mesh with a predefined mesh width. For example, the predefined mesh width may be in a range between 30 µm and 300 µm. As another example, the predefined mesh width may in particular have a mesh width of around 40 µm or around 100 µm.

In accordance with embodiments, at its end facing the opening of the bottle neck, the filter frame may have a radially outward protrusion for engagement of the filter frame on the end of the support sleeve and/or the end of the inner liner, so that the filter is held axially by form fit.

DRAWINGS

Embodiments will be illustrated by way of example in the drawings and explained in the description below.

FIG. 2 illustrates a bottom view of a filter of the pressurized gas cylinder of FIG. 1.

FIG. 3 illustrates a side view of the filter of FIG. 2.

FIG. 4 illustrates a sectional view according to A-A of FIG. 2.

FIG. 5 illustrates an isometric view of the filter of FIG. 2.

DESCRIPTION

Figure 1:
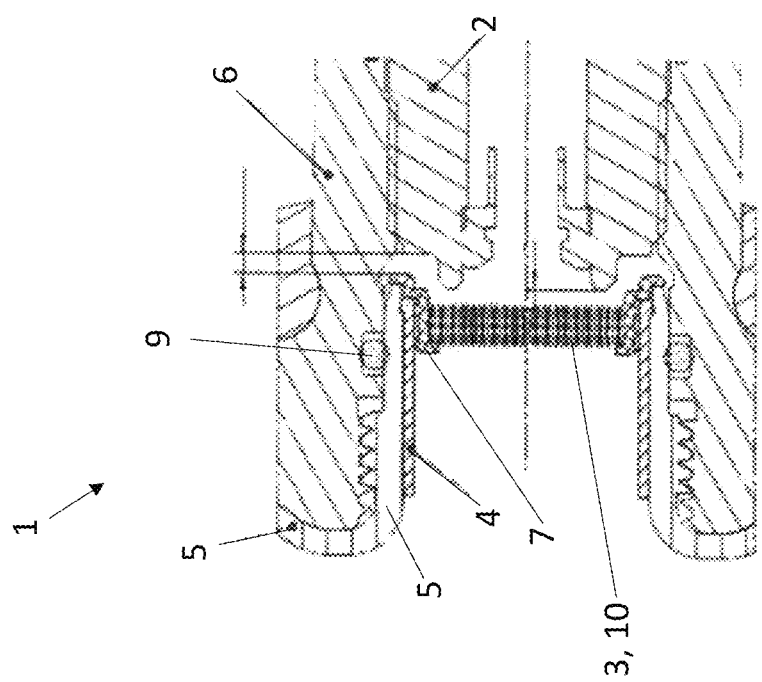
FIG. 1 illustrates a sectional view of a bottle neck of a pressurized gas cylinder, in accordance with embodiments.

FIG. 1 illustrates a bottle neck 1 of a pressurized gas cylinder in accordance with embodiments. The pressurized gas cylinder is composed of a fibre composite material, and has an inner liner 5 which forms at least one inner lining of the pressurized gas cylinder which terminates in the bottle neck 1. Radially inwardly, the inner liner 5 is supported by a support sleeve 4. The support sleeve 4 supports the open end of the inner liner 5 at the bottle neck 1 against deformation towards the inside A valve 2 for extraction of a stored compressed gas, such as, for example, CNG, is arranged inside the bottle neck 1. In accordance with embodiments, the valve 2 may comprise a magnetic valve. The valve 2 is attachable to a valve holder 6. The valve holder 6 is itself screwed to the inner liner 5 on its outer periphery. The valve holder 6 therefore surrounds the inner liner 5 radially outwardly and supports the inner liner 5 towards the outside. A ring seal 9 is arranged between the valve holder 6 and the inner liner 5. The valve 2 itself may be arranged axially outside the inner liner 5 and outside the support sleeve 4, i.e., adjacent to the open end of the bottle neck 1 of the pressurized gas cylinder.

A filter 3 configured to filter contaminants out of the compressed gas lies axially further inward in the bottle neck 1. On an outer periphery thereof, the filter 3 has a filter frame 7 and is pressed into the support sleeve 4 via this filter frame 7. At an end facing the opening of the bottle neck 1, the filter frame 7 has a bifurcated or two-stage protrusion 8 directed radially outward, so that the filter frame 7 may lie against the axially outer free end of the support sleeve 4 and of the inner liner 5. The protrusion 8 is clearly evident in FIGS. 2 to 5, which illustrate the filter 3 in a non-fitted state. The filter 3 has a filter frame 7 with a circular cross-section, and the axial protrusion 8 described. In addition, linear studs, distributed over the periphery of the filter frame 7, extend in the axial direction to secure the filter frame 7 radially. A filter base 10, also with a circular cross-section, is arranged inside the filter frame 7. The filter base 10 may have a predetermined mesh width, such as, for example, 40 µm, depending on the desired function of the filter 3.

FIG. 4 illustrates examples of further dimensions of the filter 3. In a fitted state, lying axially on the inside, the filter frame 7 may have a minimum diameter of V=18 mm. In the region of the mounting of the filter base 10, the filter frame 7 may have a diameter of W=20 mm. On the outside of the first stage of the protrusion 8, the filter frame 7 may have a diameter of U=25 mm. At the end of the second stage, the filter frame 7 may have a diameter of X=28 mm. The filter frame 7 may have a height Y of 8 mm.

The term "coupled," or "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SYMBOLS

1 Bottle neck
2 Valve
3 Filter
4 Support sleeve
5 Inner liner
6 Valve holder
7 Filter frame
8 Protrusion
9 Ring seal
10 Filter base
A-A Section
U Diameter
V Diameter
W Diameter
X Diameter
Y Height

What is claimed is:

1. A pressurized gas cylinder to store a compressed gas for a vehicle, the pressurized gas cylinder comprising:
   a bottle neck;
   a valve arranged in the bottle neck to extract the stored compressed gas from the pressurized gas cylinder;
   a valve holder attached to the valve;
   a filter to filter contaminants from the compressed gas;
   a support sleeve, a separate component from and arranged radially inwardly in the bottle neck to support the bottle neck, and to which is attached the filter radially inwardly thereon; and
   an inner liner having an open end that is supported by the support sleeve at the bottle neck, wherein the valve holder is attached to the inner liner.

2. The pressurized gas cylinder of claim 1, wherein the pressurized gas cylinder is composed of a fibre composite material.

3. The pressurized gas cylinder of claim 1, wherein the filter is press-fit connected into the support sleeve.

4. The pressurized gas cylinder of claim 1, wherein the spatial distance between the valve and the open end of the bottle neck is less than the spatial distance between the filter and the open end of the bottle neck.

5. The pressurized gas cylinder of claim 1, wherein the valve holder surrounds the inner liner radially outwardly.

6. The pressurized gas cylinder of claim 1, wherein the valve is arranged substantially axially outside the inner liner.

7. The pressurized gas cylinder of claim 1, wherein the filter comprises a filter frame that is press-fit connected into the support sleeve.

8. The pressurized gas cylinder of claim 7, wherein the filter frame comprises, at an end thereof which faces the opening of the bottle neck, a radially outward protrusion to abut against an end of the support sleeve.

9. The pressurized gas cylinder of claim 7, wherein the filter frame comprises, at an end thereof which faces the opening of the bottle neck, a radially outward protrusion to abut against an end of the inner liner.

10. A pressurized gas cylinder to store a compressed gas for a vehicle, the pressurized gas cylinder comprising:
    a bottle neck;
    a valve arranged in the bottle neck to extract the stored compressed gas from the pressurized gas cylinder;
    a filter to filter contaminants from the compressed gas;
    a support sleeve, a separate component from and arranged radially inwardly in the bottle neck to support the bottle neck, and to which is attached the filter radially inwardly thereon;
    an inner liner having an open end that is supported by the support sleeve at the bottle neck; and
    a valve holder attached to the valve and the inner liner via a screw attachment.

11. The pressurized gas cylinder of claim 10, wherein the pressurized gas cylinder is composed of a fibre composite material.

12. The pressurized gas cylinder of claim 10, wherein the filter is press-fit connected into the support sleeve.

13. The pressurized gas cylinder of claim 10, wherein the valve holder surrounds the inner liner radially outwardly such that the valve is arranged substantially axially outside the inner liner.

14. The pressurized gas cylinder of claim 10, wherein the filter comprises a filter frame that is press-fit connected into the support sleeve.

15. The pressurized gas cylinder of claim 14, wherein the filter frame comprises, at an end thereof which faces the opening of the bottle neck, a radially outward protrusion to abut against an end of the support sleeve and/or the end of the inner liner.

16. A pressurized gas cylinder to store a compressed gas for a vehicle, the pressurized gas cylinder comprising:
  a bottle neck;
  a valve arranged in the bottle neck to extract the stored compressed gas from the pressurized gas cylinder;
  a filter to filter contaminants from the compressed gas, the filter having a filter frame;
  a support sleeve, a separate component from and arranged radially inwardly in the bottle neck to support the bottle neck, and to which is attached the filter frame such that the filter frame is press-fit connected into the support sleeve;
  an inner liner having an open end supported by the support sleeve at the bottle neck; and
  a valve holder attached to the valve and the inner liner.

* * * * *